United States Patent [19]

Huber

[11] 3,740,493

[45] June 19, 1973

[54] MAGNETIC TAPE HEAD INDEXING ASSEMBLY FOR CARTRIDGE TYPE TAPE PLAYER

[75] Inventor: William B. Huber, Park Forest, Ill.

[73] Assignee: Motorola Inc., Franklin Park, Ill.

[22] Filed: Dec. 1, 1971

[21] Appl. No.: 203,572

[52] U.S. Cl. .................................179/100.2 CA, 179/100.2 Z; 242/55.19 A; 274/4 A

[51] Int. Cl. ....................... G11b 21/08, G11b 23/04

[58] Field of Search .......... 179/100.2 CA, 100.2 Z, 179/100.2 MD; 274/4 B, 4 C, 4 E, 11 A, 4 A; 242/55.19 A; 226/181

[56] References Cited

UNITED STATES PATENTS

| | | | |
|---|---|---|---|
| 3,552,751 | 1/1971 | Kelso | 179/100.2 CA |
| 3,656,761 | 4/1972 | Laschenski | 179/100.2 CA |
| 3,549,823 | 12/1970 | Pastor | 179/100.2 CA |
| 3,538,779 | 11/1970 | Yamamoto | 179/100.2 CA |
| 3,640,538 | 2/1972 | Tolar | 179/100.2 CA |
| 3,592,068 | 7/1971 | Yamada | 179/100.2 CA |

*Primary Examiner*—Bernard Konick
*Assistant Examiner*—Alfred H. Eddleman
*Attorney*—Vincent J. Rauner and R. J. LaPorte

[57] ABSTRACT

A tape head indexing assembly for a cartridge type tape player includes a first lever arm, one end of which is coupled pivotally to a pawl engageable with a ratchet wheel mounted on a rotatable tape head indexing cam. The opposite end of the first lever arm is attached to a first end of a coil spring included in a bistable mechanism; the opposite end of the coil spring being attached to the free end of a second lever arm also included in the bistable mechanism. Energization of a low power solenoid mounted adjacent the second lever arm pulls in the armature to snap the second lever arm from a first to a second stable position; the last described movement also pivoting the first lever arm to rotate the indexing cam in a first direction. A reset pin on the capstan flywheel of the tape player engages the first lever arm to return it to its original position and also to restore the bistable mechanism to its original state. Restoration of the first lever arm operates the pawl and ratchet to complete the rotation of the tape head indexing cam in the first direction.

9 Claims, 5 Drawing Figures

Patented June 19, 1973 3,740,493

2 Sheets-Sheet 1

MAGNETIC TAPE HEAD INDEXING ASSEMBLY FOR CARTRIDGE TYPE TAPE PLAYER

BACKGROUND

This invention relates generally to magnetic tape head indexing apparatus for multi-track magnetic tape players and more particularly to such tape head indexing apparatus used with cartridge type tape players.

Conventionally, the shifting of a magnetic tape head with respect to the various tracks on a multi-track magnetic tape provided in a cartridge received in a tape player, is accomplished through the use of a relatively large solenoid which is positioned to operate a ratchet which in turn rotates an indexing cam. The cam has a plurality of surfaces which when engaged with a cam follower also in contacting engagement with the movable tape head assembly, positions the tape head to different vertical levels in alignment with the various tape tracks.

An electrical signal developed in the tape player energizes the solenoid to move a pawl engageable with the ratchet to index the tape head. As mentioned heretofore, a rather large solenoid is required to operate the pawl and ratchet mechanism. The solenoid is expensive and requires relatively large power consumption, the latter of which is detrimental, especially in the case of a tape player mounted in an automobile operating from the automobile battery. Furthermore, a large solenoid requires the provision of additional space within the tape player housing.

SUMMARY

Accordingly, it is a primary object of the present invention to provide in a cartridge type tape player a new and improved multi-track tape head indexing assembly which overcomes the drawbacks of prior art tape head indexing arrangements.

It is another object of the invention to provide an improved tape head indexing assembly which requires only a relatively low powered solenoid for operation and is relatively low in cost and efficient in operation.

Briefly, a preferred embodiment of the tape head indexing assembly according to the invention includes an actuator mechanism having a lever arm, one end of which is coupled pivotally to the pawl member of a cam rotatable for indexing a tape head. The opposite end of the lever arm is attached to a first end of a coil spring, the opposite end of the coil spring being attached to a free end of a second lever arm pivoted about a stationary support at the opposite end thereof. The coil spring and second lever arm form a snap-over or bistable spring arrangement; the second lever arm being movable to first and second stable positions by force provided by the coil spring.

A relatively small, low power solenoid is mounted with the actuator arm thereof positioned for engagement of the free end of the second lever arm. Operation of the solenoid causes the second lever arm to be moved from the first to the second stable state, to in turn pivot the first lever arm from a first to a second position, thereby operating the pawl and ratchet mechanism to rotate the tape head indexing cam through a predetermined distance to begin the movement of the tape head with respect to a multi-track magnetic tape. The first lever arm is returned to its initial position by the engagement thereof with a reset pin mounted on the tape player flywheel used to drive the capstan shaft.

Return of the first lever arm to its initial position returns the second lever arm to its first stable state and rotates the tape head indexing cam through an additional predetermined distance to complete the movement of the tape head.

DETAILED DESCRIPTION

Figure 1:
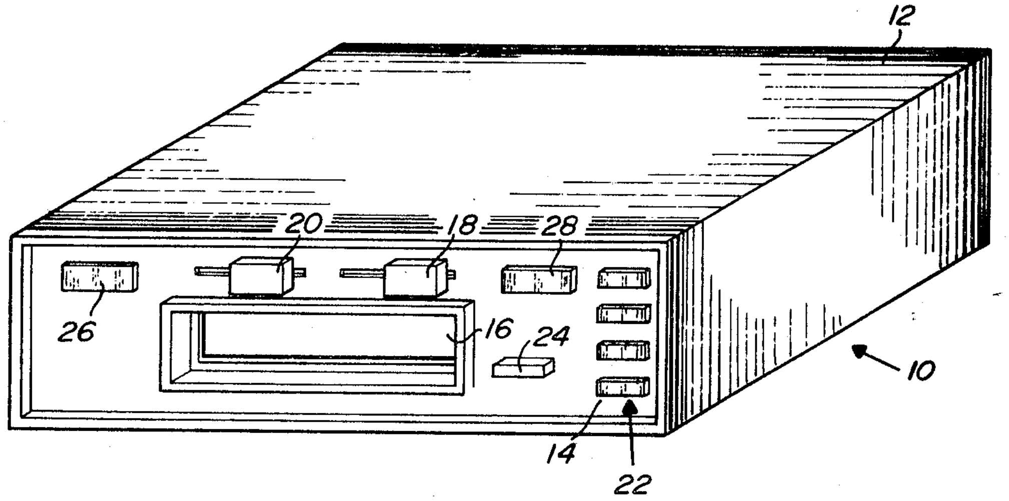
FIG. 1 is a perspective view of a cartridge type tape player incorporating a tape head indexing assembly according to the invention.

Referring now to the drawings in greater detail wherein like numerals have been employed throughout the various views to designate similar parts, there is shown in FIG. 1, a cartridge type tape player 10 incorporating a tape head indexing assembly 11 according to the invention. The player 10 is of the usual type having a housing 12 in which the tape playing and driving instrumentalities are mounted, with a front plate 14, having an opening 16 therein into which a cartridge including a multi-track magnetic tape, is inserted for playing back information recorded thereon. Also provided on front plate 14 are controls such as 18, 20 for adjusting the volume and tone, a channel or track indicator 22 to indicate to an operator the track being reproduced audibly by the player, a pushbutton 24 for operating the tape head indexing assembly when it is desired to change the position of the tape head with respect to the various tape tracks and channel volume indicators 26, 28.

Figure 2:
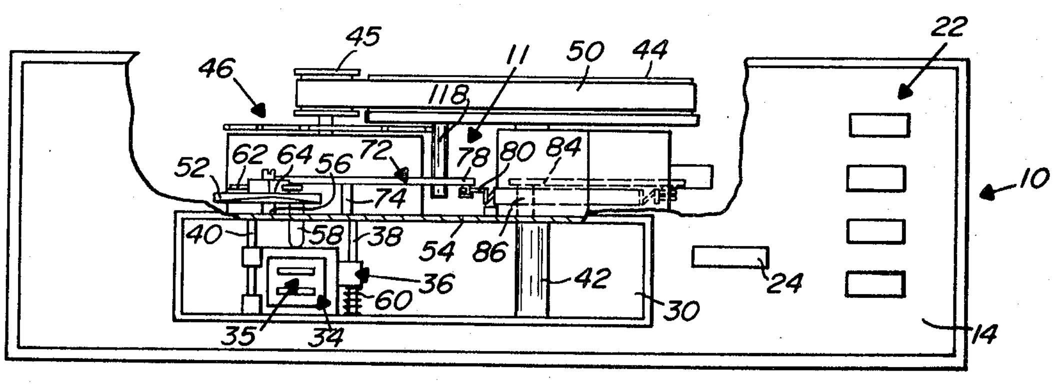
FIG. 2 is a front cutaway view of the cartridge tape player of FIG. 1.
Figure 3:
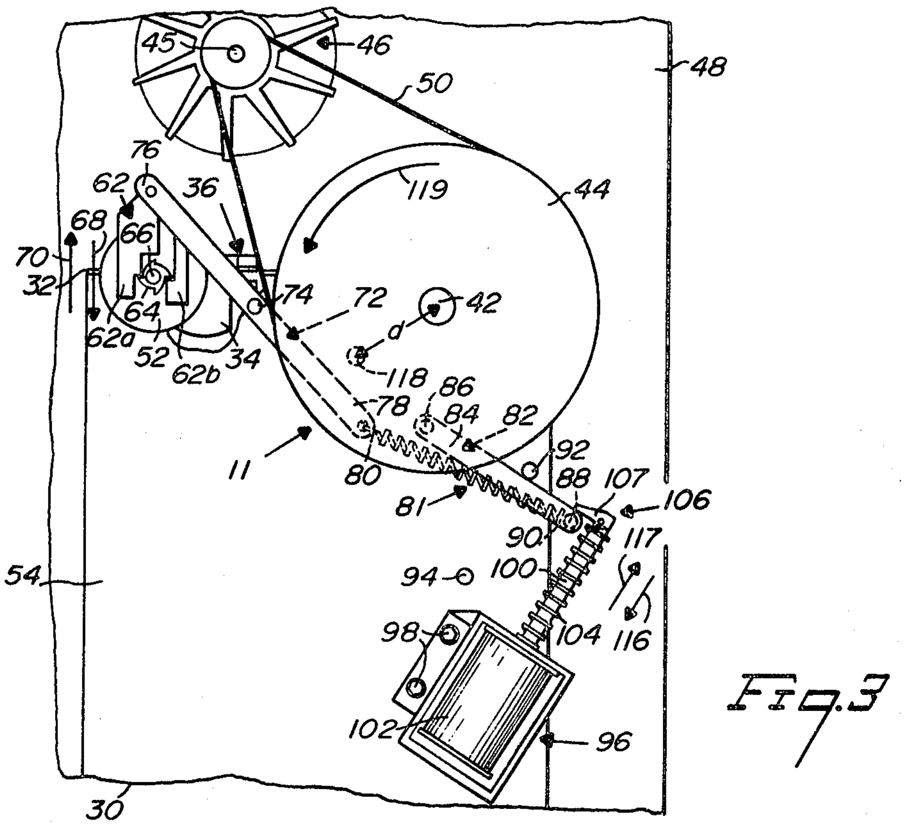
FIGS. 3 and 4 are top, plan views of the tape player of FIG. 2 illustrating the tape head indexing assembly therein as it appears in operated and unoperated conditions, respectively.
Figure 4:
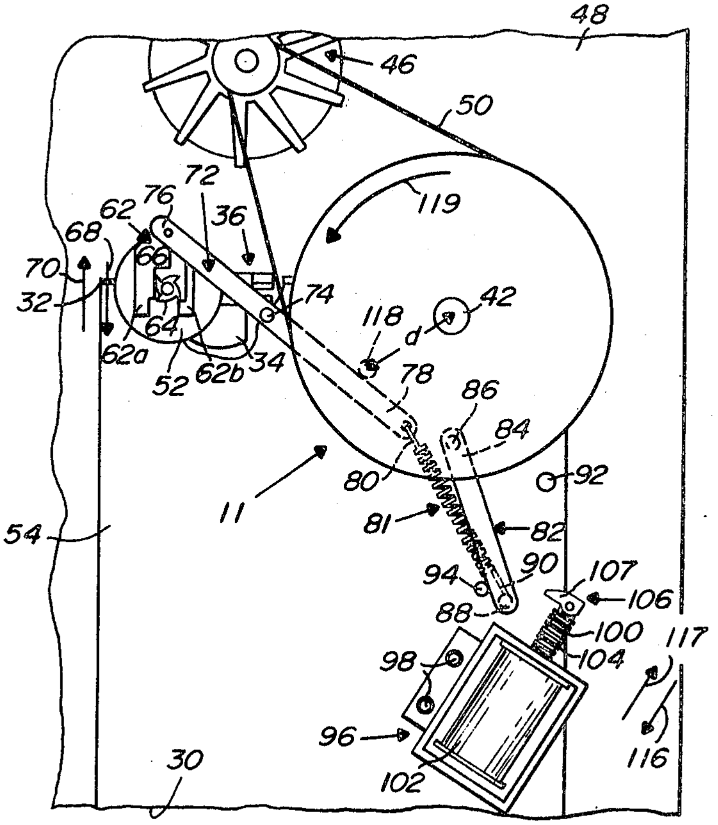

Looking at FIGS. 2–4, there is shown the cartridge receiving tunnel 30 into which opening 16 in front plate extends, provided within housing 12 for receiving a tape cartridge. At the inner end 32 of the tunnel, there is provided a magnetic tape head 34 having a magnetic pick-up area 35 formed thereon. The tape head is mounted on a bracket assembly 36 for movement vertically on pins 38, 40 (FIG. 2) to change the position of the pick-up area of the tape head with respect to the various tracks on a magnetic tape in a cartridge inserted into tunnel 30. Spaced from and substantially aligned with tape head 34 is a capstan drive shaft 42 extending upwardly out of the tunnel 30. A flywheel 44 is mounted on the free end of the capstan shaft for driving the shaft rotatably. The drive shaft 45 of a drive motor 46 mounted on the base wall 48 of the tape player housing is coupled to the flywheel 44 by a drive belt 50 for imparting rotatable movement to the flywheel from drive motor 46. Upon insertion of a cartridge into tunnel 30, a switch (not shown) is actuated to complete a circuit to drive motor 46 for driving the capstan drive shaft 42. Removal of the cartridge interrupts the circuit.

The tape head indexing assembly 11 according to the invention and incorporated into the tape player 10, includes a rotatable cam 52 mounted on an internal wall 54 comprising the top wall of tunnel 30. The cam includes a plurality of cam surfaces 56, herein having four surfaces, which engage a force transmitting pin 58 extending through wall 54 to engage the tape head bracket assembly 36. Rotation of cam 52 positions a different cam surface with respect to pin 58 to move the bracket assembly and tape head along pins 38, 40 against the force of a biasing spring 60 (FIG. 2) encircling pin 38. Between the forces provided by cam surfaces 54 against pin 58 and coil spring 60, the tape head is moved to predetermined vertical positions along pins 38, 40, thereby to align the pick-up area 35 with the various recording tracks on a magnetic tape in a cartridge inserted into the tunnel.

Rotation of cam 52 is accomplished through the action of a pawl and ratchet 62, 64, respectively, the last-mentioned of which is mounted on the central shaft 66 upon which cam 52 is mounted, for rotation therewith. Movement of pawl 62 in the direction of arrows 68, 70, respectively, turns ratchet 62 a predetermined distance in a counterclockwise direction as viewed in FIGS. 3 and 4 to move a successive one of the cam surface 56 into contacting engagement with pin 58 for adjusting the position of tape head 34 with respect to the magnetic recording tape.

Included in the tape head indexing assembly 11 is an actuator mechanism comprising a first lever arm 72 which is mounted near the center thereof on a tunnel wall 54 by a pin 74. The lever arm is pivotal about pin 74. A first end 76 of the lever arm is connected pivotally to the pawl 62. The opposite end 78 of the lever arm is connected to a first end 80 of a coil spring 81 which in combination with a second lever arm 82 comprises a bistable mechanism. The lever arm 82 is pivotally mounted at a first end 84 thereof by means of a pin 86 to the wall 54. The opposite end 88 of the lever arm is connected to the end 90 of the coil spring 81.

The arm 82 is pivotal through the action of spring 81, from a first stable position or state whereat arm 82 is positioned against a first stop 92 (FIG. 3) to a second stable state against a stop 94 (FIG. 4).

Figure 5:
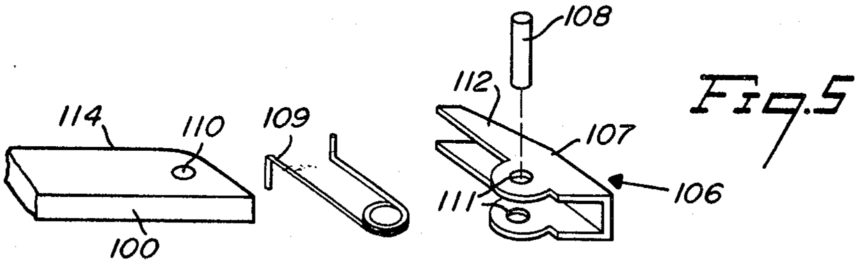
FIG. 5 is an enlarged exploded view of a finger mechanism mounted at the free end of the armature of a solenoid used in the tape head indexing mechanism according to the invention.

Mounted on wall 54 also, is a low power solenoid 96. The solenoid is attached to the wall with suitable fasteners 98 and includes an armature 100 movable upon energization of the solenoid coil 102, from a first extended position (FIG. 3) against the force of a biasing spring 104 to a second retracted position (FIG. 4). Mounted at the end of the solenoid armature 100 is a finger assembly 106 including a finger 107 for engaging the end 90 of arm 82 to move the latter from the first bistable position toward the second bistable position. The finger 107 is pivotal on pin 108 extending through apertures 111 therein. The pin 108 is also used to attach the finger to arm 100 through an aperture 110 provided therein. A spring 109 maintains the finger 107 of the assembly at right angles with respect to armature 100 so that the finger is positioned normally to engage end 90 of arm 82. If engaged at the top surface 112 of finger 107 (FIG. 5) with sufficient force applied thereagainst, the force of spring 108 is overcome and the finger 107 is pivoted about pin 108 downwardly (counterclockwise as viewed in FIGS. 3 and 4) to take a position over edge 114 of the armature. The latter movement is provided in the event finger 107 engages end 90 of arm 82 as the former moves in the direction of arrow 16 (upon de-energization of the solenoid coil 102) to prevent jamming.

A reset pin 118 the function of which will be described in greater detail hereinafter, is provided on flywheel 44 extending downwardly therefrom for engagement with lever arm 72. The reset pin 118 is mounted radially outwardly from the axis of rotation of the flywheel a predetermined distance *d*.

For purposes of affording a more complete understanding of the invention, it is advantageous now to provide a functional description of the mode in which the component parts thus far described cooperate.

Subsequent to the insertion of a cartridge into opening 16 and tunnel 30 of the player 10, the drive motor 46 is energized to drive flywheel 44 and capstan drive shaft rotatably to transport the magnetic tape through the cartridge. The flywheel is rotated in a counterclockwise direction, (arrow 119) as viewed in FIGS. 3 and 4.

Tape head 34 is positioned initially so that pick-up area 35 is in alignment with one of the many tracks on the tape. As indicated by track indicator 22, the particular tape player shown is constructed to accommodate a cartridge using a tape having four track positions. When the reproduction or playing-back of information on the tape track with which the tape head pick-up area is initially aligned has been completed, or if the manual tape head indexing pushbutton 24 is depressed, solenoid coil 102 is energized. Energization of the last-mentioned coil pulls in the armature 100 in the direction of arrow 116 against the force of spring 104. Finger 107 at the end of the armature engages end 88 of arm 82, causing the latter to be moved away from stop 92 pivotally toward stop 94. Movement of the lever arm 82 in a clockwise direction (FIGS. 3 and 4) to a location just beyond the snap-over point of spring 81, permits the force of spring 81 to act on the arm thereby quickly moving it the remaining distance toward stop 94. At the same time, lever arm 72 connected to the bistable mechanism, is pivoted in a counterclockwise direction as viewed in FIGS. 3 and 4 to cause pawl 62 to be moved in the direction of arrow 68 so that arm **62*a* thereof engages ratchet 64.**

The last described movement rotates ratchet and cam 52 a predetermined distance, (approximately 45° in the case of a four position player) to begin positioning a different one of the cam surfaces 56 into contacting engagement with force transmitting pin 58. Flywheel 44 which continues rotating in the direction of arrow 119 brings reset pin 118 toward the lever arm 72 which is now in the position shown in FIG. 4. Engagement of the reset pin 58 with lever arm 72, forces the latter to pivot in a clockwise direction, causing end 78 of the lever arm to be moved toward its original position. The latter movement likewise moves spring 81 back to the snap-over point, to return pivotal arm 82 to its initial position (FIG. 3). The movement of lever arm 72 moves pawl 62 in the direction of arrow 70 causing arm 62b to engage ratchet 64 to complete the rotation of the ratchet and cam 52 (approximately a second 45°) thereby moving the new cam surface 56 into engagement with pin 58. The solenoid armature 100 is returned by spring 104 in the direction of arrow 117 after having moved arm 82 from the first stable position toward the second stable position. The entire indexing procedure takes place rigidly since flywheel 44 is maintained rotating while a cartridge remains in the player.

The solenoid 96 is as mentioned heretofore, of a low power type since the force provided thereby must only bring the bistable mechanism comprised of arm 82 and spring 81, to a snap-over position. Thereafter, the force of the bistable mechanism suffices to move the lever arm 72 pivotally to index tape head 34.

It should be noted, that while in the preferred embodiment of the tape head indexing assembly described, movement of cam 54 is accomplished in a two step fashion, it is possible, through the substitution of an alternative arrangement for pawl and ratchet 62, 64, to rotate cam member 52 a full 90° (in the case of the four position player) during the movement of arm 82 from stop 92 to stop 94. In the latter case, resetting of the assembly by reset pin 118 would not effect further movement of cam 52, but would only move the lever arm 72 into a set position for further indexing of tape head 34.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. In a cartridge type tape player adapted to receive and play a cartridge having a multi-track recording tape therein, and including a magnetic tape head having a magnetic pick-up area formed thereon, said tape head being mounted for movement with respect to said tape for aligning said pick-up area with the various tracks on said tape, a tape head indexing assembly including a cam member positioned at a fixed location and mounted for rotation thereat having a plurality of cam surfaces coacting with said tape head for moving the latter to different positions with respect to said tape tracks and cam driver means coupled to said cam member and movable between first and second positions to rotate said cam member for positioning a different one of said cam surfaces into coacting relation with said tape head, cam driver actuating means for moving said cam driver means between said first and second positions when desired to change the position of said tape head with respect to the various tracks of said magnetic recording tape, said actuating means including a lever arm pivotal about a first point for movement between normal and set positions, said lever arm coupled at one end to said cam driver means for movement thereof from said first to said second position in response to the movement of said lever arm from said normal to said set position, bistable means movable to first and second stable states coupled to the opposite end of said lever arm and actuator means engageable with said bistable means to move the latter from said first to said second stable state, said bistable means in response thereto, pivoting said lever arm from said normal to said set position thereby to rotate said cam member for indexing said tape head to a different position with respect to said tape tracks.

2. A cartridge type tape player as claimed in claim 1 wherein said actuator means comprises a solenoid having a movable armature engageable with said bistable means when the latter is in said first stable state and operable to move said bistable means from said first to said second stable state.

3. In a cartridge type tape player adapted to receive and play a cartridge having a multi-track recording tape therein, and including a magnetic tape head having a magnetic pick-up area formed thereon, said tape head being mounted for movement with respect to said tape for aligning said pick-up area with the various tracks on said tape, a tape head indexing assembly including a cam member having a plurality of cam surfaces coacting with said tape head for moving the latter to different positions with respect to said tape and cam driver means coupled to said cam member and movable to change the position of said cam member, cam driver actuating means for moving said cam driver means when desired to change the position of said tape head with respect to said magnetic recording tape, said actuating means including a lever arm pivotal about a first point and coupled at one end to said cam driver means, bistable means movable to first and second stable states coupled to the opposite end of said lever arm and actuator means engageable with said bistable means to move the latter from said first to said second stable state, said bistable means in response thereto pivoting said lever arm from a normal to a set position thereby to reposition said cam member for indexing said tape head to a different position, and wherein said bistable means comprises a second lever arm pivotal at a predetermined point thereon and a spring member connected to a free end of said lever arm and said opposite end of said first lever arm, said free end of said lever arm being positioned in said first stable state for engagement by said actuator means, whereby the latter pivots said second lever arm from said first to said second stable state thereby to rapidly pivot said first lever arm to reposition said cam.

4. In a cartridge type tape player adapted to receive and play a cartridge having a multi-track recording tape therein, and including a magnetic tape head having a magnetic pick-up area formed thereon, said tape head being mounted for movement with respect to said tape for aligning said pick-up area with the various tracks on said tape, a tape head indexing assembly including a cam member having a plurality of cam surfaces coacting with said tape head for moving the latter to different positions with respect to said tape and cam driver means coupled to said cam and movable to change the position of said cam member, cam driver actuating means for moving said cam driver means when desired to change the position of said tape head with respect to said magnetic recording tape, said actuating means including a lever arm pivotal about a first point and coupled at one end to said cam driver means, bistable means movable to first and second stable states coupled to the opposite end of said lever arm and actuator means engageable with said bistable means to move the latter from said first to said second stable state, said bistable means in response thereto, pivoting said lever arm from a normal to a set position thereby to reposition said cam member for indexing said tape head to a different position, wherein said cam driver actuating means further includes restoration means engageable with and for pivotally returning said lever arm to said normal position to restore said bistable means to said first stable state, and further including a rotatable capstan shaft engageable with the multi-track tape in said cartridge for driving said tape through said cartridge, a drive motor and a flywheel mounted for rotation with said capstan shaft and coupled to said drive motor and wherein said restoration means includes a reset member mounted on said flywheel radially outwardly from the axis of rotation thereof, said reset member revolving into engagement with said lever arm upon the latter being in said pivoted position to return the lever arm to a normal position.

5. A cartridge type tape player as claimed in claim 4 wherein said recording tape includes a predetermined number of tracks, wherein said tape head indexing cam member is mounted for rotation and includes an equal number of cam surfaces each comprising a predetermined area of said cam member and wherein upon actuation of said bistable means from said first to said second stable store, said cam member is rotated approximately one-half the distance of said section and upon operation of said restoration means for restoring said lever arm to said first position, said cam member is rotated the additional one-half of the distance, thereby to position a successive cam surface with respect to said tape head for indexing the latter with respect to said tape.

6. A tape head indexing assembly for use in a cartridge type tape player adapted to receive and play a cartridge having a multi-track recording tape mounted therein for movement therethrough and including a continually driven capstan drive shaft engageable with and for driving the tape through said cartridge, means coupled to said capstan shaft for continual rotation therewith and a magnetic tape head having a magnetic pick-up area formed thereon, said magnetic tape head being mounted for movement in a direction transverse the movement of said tape through said cartridge for aligning said pick-up area with the various tracks on said tape, said tape head indexing assembly including in combination; a cam member having a plurality of cam surfaces coacting with said tape head for moving the latter to a predetermined number of positions with respect to said tape, cam driver means coupled to said cam and movable in predetermined directions to change the position of said cam member, cam driver actuating means for moving the cam driver means in said predetermined directions, said actuating means including a movable arm member coupled to said cam driver means, a bistable mechanism movable to first and second stable states coupled to said movable arm member, actuator means engageable with said bistable mechanism to move the latter from said first to said second stable state, said bistable means in turn moving the arm member of said actuating means in a first direction to initiate a change in position of said cam member, and restoration means mounted on said continuously rotating means engageable with said arm member to move the latter in a direction opposite from said first one of said directions to complete the change in position of said cam member, thereby to move said tape head and align said pick-up area with a different track on said tape.

7. A tape head indexing assembly as claimed in claim 6 wherein said arm member of said actuating means is mounted for pivotal movement, wherein said bistable mechanism includes a second pivotal arm member and a spring connected to a free end of the last-mentioned arm member and free end of said arm member of said actuating means and wherein said actuator means includes a solenoid having an armature movable upon energization thereof from a first to a second position and engageable with said arm member of said bistable means, whereby upon energization of said solenoid the armature thereof is moved to pivot said bistable arm member thereby moving said bistable mechanism from the first to the second stable state to move said arm member of said actuating means in said first one of said directions.

8. A tape head indexing assembly as claimed in claim 7 wherein said continuously rotatable means includes a flywheel mounted on said capstan shaft wherein said cartridge type tape player further includes a drive motor coupled to said flywheel and operable to rotate the latter for driving the magnetic recording tape through said cartridge and wherein said restoration means includes a reset pin mounted on said flywheel radially outwardly from the axis of rotation thereof for engagement with said pivotal arm member of said actuator means.

9. A tape head indexing assembly as claimed in claim 8 wherein said cam driver means includes a pawl and ratchet coupled to said cam member for rotating the latter, the pawl being attached pivotally to said arm member of said actuating means for movement in a first direction in response to the pivotal movement of said arm member in said first direction and for movement in the opposite direction in response to the pivotal movement of said arm member in the opposite direction, thereby to rotate said cam member in a predetermined direction to position a different one of said cam surfaces for coaction with said tape head.

* * * * *